(12) United States Patent
Hayashida et al.

(10) Patent No.: US 11,033,159 B2
(45) Date of Patent: Jun. 15, 2021

(54) TOILET SEAT

(71) Applicant: TOTO LTD., Kitakyushu (JP)

(72) Inventors: Takeshi Hayashida, Kitakyushu (JP);
Nobuhiko Umeda, Kitakyushu (JP);
Shuhei Nishiyama, Kitakyushu (JP);
Takeshi Inada, Kitakyushu (JP);
Minoru Sato, Kitakyushu (JP)

(73) Assignee: Toto Ltd., Fukuoka (JP)

(*) Notice: Subject to any disclaimer, the term of this patent is extended or adjusted under 35 U.S.C. 154(b) by 0 days.

(21) Appl. No.: 16/767,823

(22) PCT Filed: Mar. 30, 2018

(86) PCT No.: PCT/JP2018/013644
§ 371 (c)(1),
(2) Date: May 28, 2020

(87) PCT Pub. No.: WO2019/187017
PCT Pub. Date: Oct. 3, 2019

(65) Prior Publication Data
US 2021/0000308 A1    Jan. 7, 2021

(30) Foreign Application Priority Data
Mar. 29, 2018    (JP) .............................. JP2018-063582

(51) Int. Cl.
*A47K 13/02* (2006.01)
*B29C 45/14* (2006.01)
*B29L 31/00* (2006.01)

(52) U.S. Cl.
CPC ........ *A47K 13/02* (2013.01); *B29C 45/14467* (2013.01); *B29L 2031/7694* (2013.01); *B29L 2031/771* (2013.01)

(58) Field of Classification Search
CPC .............. A47K 13/02; B29C 45/14467; B29L 2031/7694; B29L 2031/771
(Continued)

(56) References Cited

U.S. PATENT DOCUMENTS 10,682,026 B2 *  6/2020  Hayashida ............. A47K 13/02
10,874,267 B2 * 12/2020  Inada ..................... A47K 13/02
(Continued)

FOREIGN PATENT DOCUMENTS

JP    H09-290437 A    11/1997
JP    2000-272014 A   10/2000
(Continued)

*Primary Examiner* — Tuan N Nguyen
(74) *Attorney, Agent, or Firm* — Carrier Blackman & Associates, P.C.; Joseph P. Carrier; William D. Blackman

(57) ABSTRACT

A toilet seat includes: a bottom plate including an engaging part; a top plate including a sidewall part provided on the bottom plate and a seating part supported by the sidewall part; and a bonding member having an exposed surface exposed externally. The engaging part is provided at a position opposing the sidewall part and has a recessed shape recessed downward. The sidewall part includes a sidewall base, a first hanging part extending downward from the sidewall base and engaging the engaging part, and a second hanging part provided to be separated from the first hanging part at the sidewall base to provide a recess recessed upward between the first hanging part and the second hanging part, the second hanging part being disposed at a position not overlapping the bottom plate. A side surface of the engaging part faces away and also extends away from the second hanging part.

4 Claims, 7 Drawing Sheets

(58) Field of Classification Search
USPC .............................................................. 4/237
See application file for complete search history.

(56)  References Cited

U.S. PATENT DOCUMENTS

2017/0071423 A1    3/2017  Hayashida et al.
2020/0275810 A1*   9/2020  Hayashida ............. A47K 13/02

FOREIGN PATENT DOCUMENTS

| | | |
|---|---|---|
| JP | 2008-105325 A | 5/2008 |
| JP | 2012-045170 A | 3/2012 |
| KR | 20-0409363 Y1 | 2/2006 |
| TW | 201717829 A | 6/2017 |

\* cited by examiner

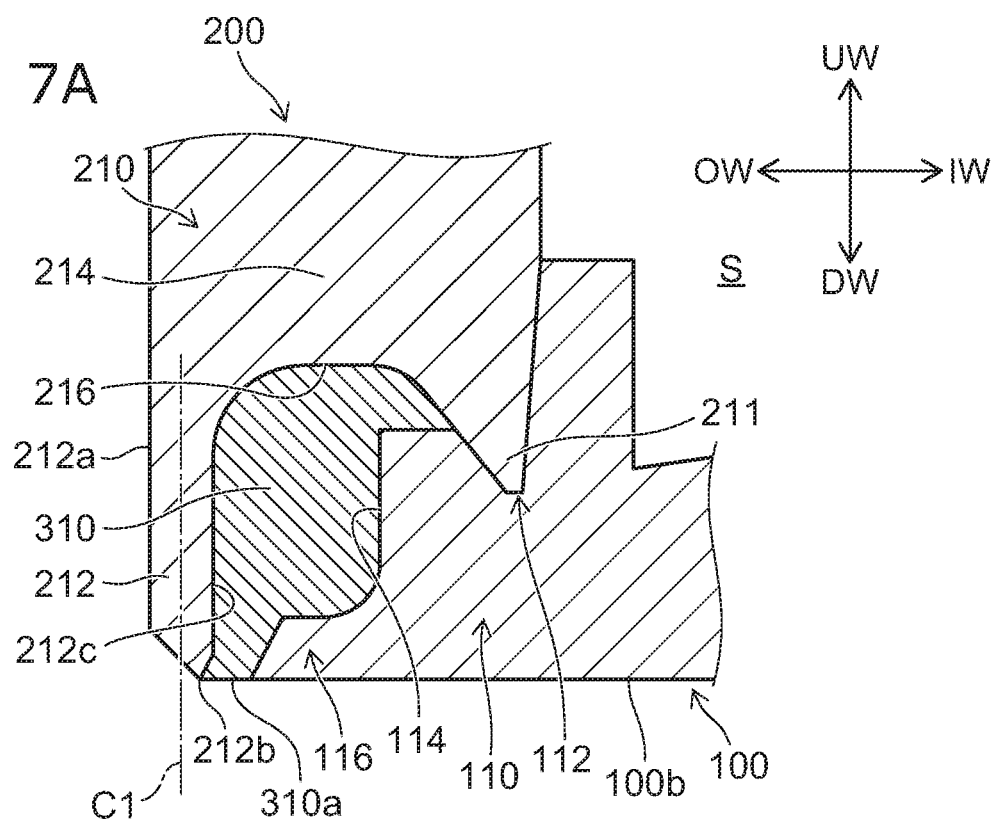
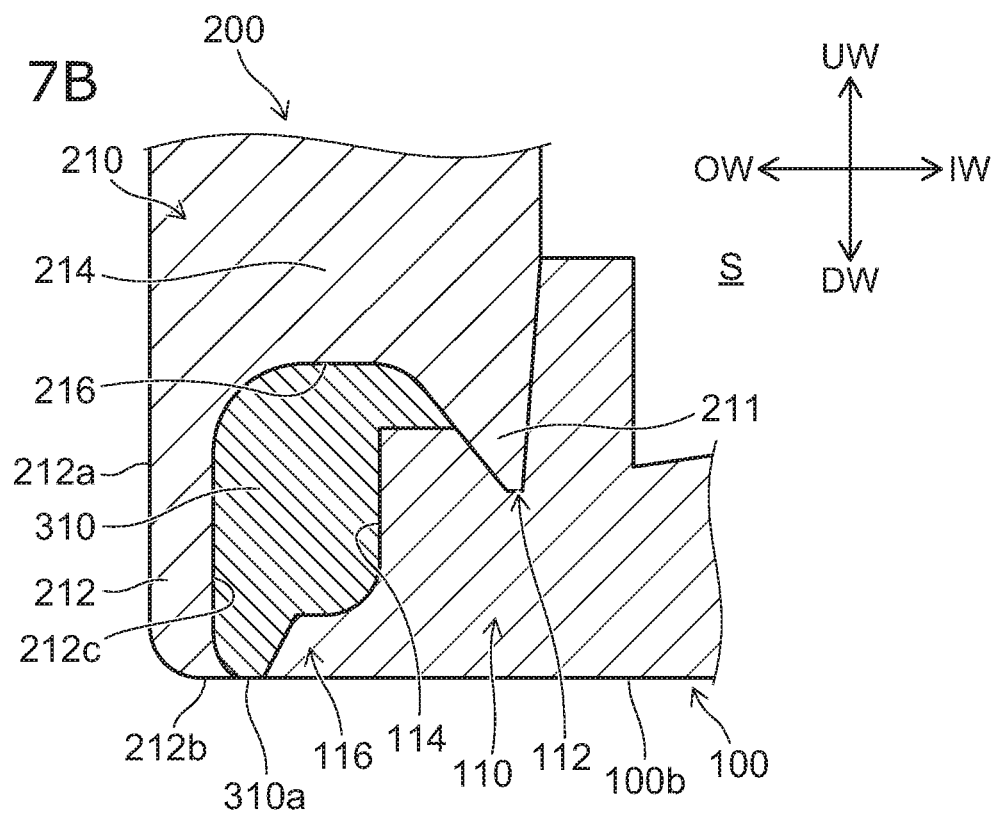

TOILET SEAT

TECHNICAL FIELD

Embodiments of the invention relate generally to a toilet seat.

BACKGROUND ART

For example, a toilet seat is configured by bonding a bottom plate provided at the toilet side to a top plate contacted by the buttocks. Patent Document 1 (Japanese Patent No. 3733778) discusses technology in which these parts made of resin are bonded by filling a bonding resin into a passageway formed between the parts made of resin.

To improve the cleanability of the toilet seat, it is desirable to suppress the occurrence of a joint, a step, a gap, etc., at the bonding part between the top plate and the bottom plate. In a manufacturing method in which a resin is filled, compared to other manufacturing methods, post processes such as grinding, polishing, etc., can be reduced, and a toilet seat that has high cleanability can be manufactured relatively easily.

On the other hand, in the manufacturing method in which the resin is filled, it is necessary to prevent the filled resin from leaking to the outer surfaces of the top plate and/or the bottom plate. If the resin undesirably leaks to the outer surfaces of the top plate and/or the bottom plate, the part becomes defective, a process for removing the leaked resin is necessary, and the productivity of the toilet seat undesirably may decrease.

For example, it also may be considered to suppress the resin leakage by providing a projection at the periphery of an injection inlet of the resin and by increasing the contact pressure of the mold at the periphery of the injection inlet. However, if such a projection undesirably remains as-is, the cleanability of the toilet seat may decrease. On the other hand, the productivity undesirably may decrease if a process for removing the projection or the like is added. Also, even if the projection is mashed, a new unevenness undesirably may occur due to deformation of the projection base.

Therefore, in the case where the top plate and the bottom plate are bonded by filling a resin in the toilet seat, it is desirable to obtain high cleanability and productivity while appropriately suppressing the resin leakage.

PRIOR ART DOCUMENTS

Patent Literature

[PTL 1]
Japanese Patent No. 3733778

SUMMARY OF INVENTION

Problem to be Solved by the Invention

The invention is based on a recognition of these problems and is directed to provide a toilet seat in which high cleanability and productivity can be obtained while appropriately suppressing the resin leakage in the case where the top plate and the bottom plate are bonded by filling a resin.

Means for Solving the Problem

A first invention is a toilet seat that includes a bottom plate including an engaging part having a recessed shape, a top plate including a sidewall part provided on the bottom plate and a seating part supported by the sidewall part, and a bonding member bonding the bottom plate and the sidewall part and having an exposed surface exposed externally; the engaging part is provided at a position opposing the sidewall part and has a recessed shape recessed downward; the sidewall part includes a sidewall base supporting the seating part, a first hanging part extending downward from a lower end of the sidewall base, and a second hanging part disposed at a position not overlapping the bottom plate in a vertical direction; the first hanging part overlaps the bottom plate and engages the engaging part; the second hanging part is provided to be separated from the first hanging part at the lower end of the sidewall base to provide a recess recessed upward between the first hanging part and the second hanging part; the bonding member is provided in the recess; the exposed surface is disposed between the second hanging part and the bottom plate; and a side surface of the engaging part facing away from the second hanging part extends away from the second hanging part downward.

According to the toilet seat, the side surface of the engaging part facing away from the second hanging part is tilted or curved away from the second hanging part downward; thereby, when manufacturing the toilet seat by pressing a mold to the bottom plate and the second hanging part and injecting a resin used to form the bonding member into the recess from the bottom plate side, the force that accompanies the pressing of the mold can be transferred from the side surface of the engaging part to the lower end portion of the part of the bottom plate opposing the second hanging part. The lower end portion of the part of the bottom plate opposing the second hanging part is a part of the injection inlet for injecting the resin. Thus, by transferring the force accompanying the pressing of the mold to the part of the bottom plate used as a part of the injection inlet, the contact pressure (the sealing pressure) from the mold at the periphery of the injection inlet can be increased without providing a projection, etc. Thereby, the undesirable leakage of the injected resin from the injection inlet can be suppressed appropriately even without providing a projection, etc. It is unnecessary to add a process for removing leaked resin, a projection, etc., and the decrease of the productivity can be suppressed. Accordingly, in the case where the top plate and the bottom plate are bonded by filling a resin, a toilet seat can be provided in which high cleanability and productivity can be obtained while appropriately suppressing the resin leakage.

A second invention is the toilet seat of the first invention, wherein a virtual line orthogonal to at least a part of the side surface of the engaging part passes through the exposed surface.

According to the toilet seat, the force that accompanies the pressing of the mold can be transferred more appropriately to the lower end portion of the part of the bottom plate opposing the second hanging part used as a part of the injection inlet for injecting the resin. Accordingly, the contact pressure from the mold at the periphery of the injection inlet can be increased further, and the resin leakage can be suppressed more reliably.

A third invention is a toilet seat of the first or second invention, wherein the bottom plate includes an opposing surface and a protruding part, the opposing surface opposing the second hanging part, the protruding part extending from a lower end portion of the opposing surface toward the second hanging part.

According to the toilet seat, the pressure that accompanies the injection of the resin can be transferred via the protruding part to the lower end portion of the part of the bottom plate opposing the second hanging part. Thereby, the contact pressure from the mold at the periphery of the injection inlet can be increased further, and the resin leakage can be suppressed more reliably.

A fourth invention is the toilet seat of the third invention, wherein the protruding part has a side surface opposing the second hanging part, and the side surface of the protruding part approaches the second hanging part downward.

According to the toilet seat, the pressure that accompanies the injection of the resin can be transferred more appropriately via the protruding part to the lower end portion of the part of the bottom plate opposing the second hanging part, and the resin leakage can be suppressed more reliably.

A fifth invention is the toilet seat of the fourth invention, wherein the protruding part has an upper surface facing upward, and an angle between the upper surface of the protruding part and a bottom surface of the bottom plate is less than an angle between the side surface of the protruding part and the bottom surface of the bottom plate.

According to the toilet seat, the pressure that accompanies the injection of the resin can be transferred more appropriately via the protruding part to the lower end portion of the part of the bottom plate opposing the second hanging part, and the resin leakage can be suppressed more reliably.

Effects of the Invention

According to an aspect of the invention, a toilet seat can be provided in which high cleanability and productivity can be obtained while appropriately suppressing resin leakage in the case where the top plate and the bottom plate are bonded by filling a resin.

BRIEF DESCRIPTION OF DRAWINGS

FIG. 7A and FIG. 7B are cross-sectional views illustrating modifications of the inner perimeter supporter and the inner perimeter sidewall part according to the embodiment.

DESCRIPTION OF EMBODIMENTS

Figure 1:
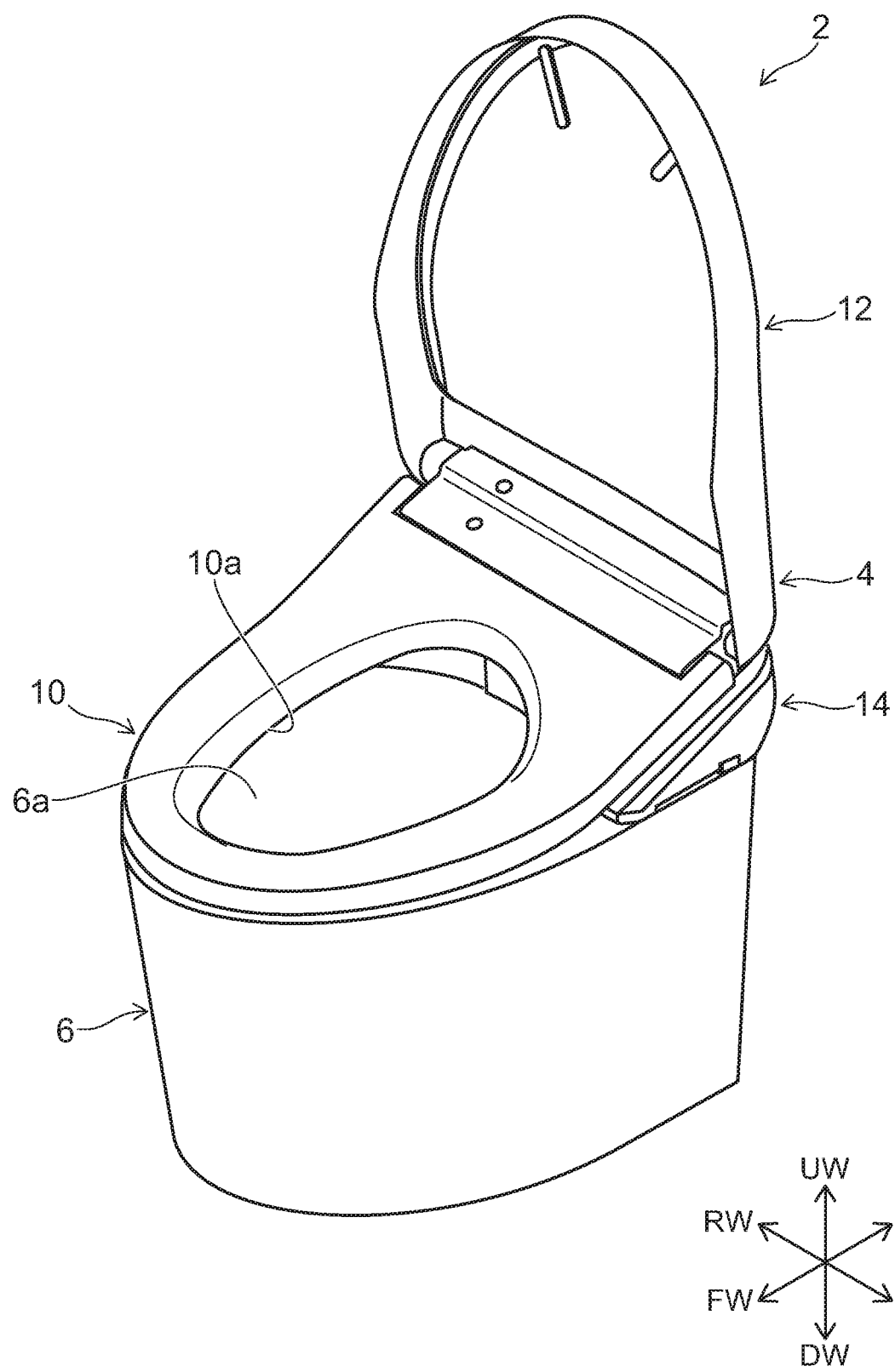
FIG. 1 is a perspective view illustrating a toilet device including a toilet seat according to an embodiment.

Embodiments of the invention will now be described with reference to the drawings. Similar components in the drawings are marked with the same reference numerals, and a detailed description is omitted as appropriate.

FIG. 1 is a perspective view illustrating a toilet device including a toilet seat according to an embodiment.

As illustrated in FIG. 1, the toilet device 2 includes a toilet seat device 4 and a western-style sit-down toilet (hereinbelow, called simply the "toilet") 6.

The toilet seat device 4 is mounted on the toilet 6. The toilet seat device 4 may be mounted to have a continuous body with the toilet 6 or may be detachably mounted to the toilet 6. The toilet seat device 4 includes a toilet seat 10, a toilet lid 12, and a main part 14.

Here, in this specification, upward when viewed by a user sitting on the toilet seat 10 is taken as "upward", and downward when viewed by the user sitting on the toilet seat 10 is taken as "downward". Also, when viewed by the user sitting on the toilet seat 10 with the user's back facing the toilet lid 12 in the open state, the leftward and rightward directions are respectively taken as "leftward" and "rightward", and the frontward and backward directions are respectively taken as "frontward" and "backward". FIG. 1 illustrates an example of upward UW, downward DW, leftward LW, rightward RW, frontward FW, and backward BW.

The toilet 6 includes a bowl 6a recessed downward. The toilet 6 receives, in the bowl 6a, excrement such as urine, feces, etc., of the user. The main part 14 of the toilet seat device 4 is provided at the upper part of the toilet 6 back of the bowl 6a. The main part 14 is pivotally supported by the toilet seat 10 and the toilet lid 12 to be openable and closable.

The toilet seat 10 has an opening 10a. The toilet seat 10 is provided on the toilet 6 to surround the outer edge of the bowl 6a, and the bowl 6a is exposed via the opening 10a. Thereby, the user can excrete into the bowl 6a in the state of sitting on the toilet seat 10. In the example, a so-called O-shaped toilet seat 10 is shown in which the opening 10a is formed in a through-hole configuration. The toilet seat 10 is not limited to being O-shaped and may be U-shaped, etc. A heater that warms the seating part (the part contacted by the buttocks of the user), etc., may be provided as appropriate inside the toilet seat 10.

Figure 2:
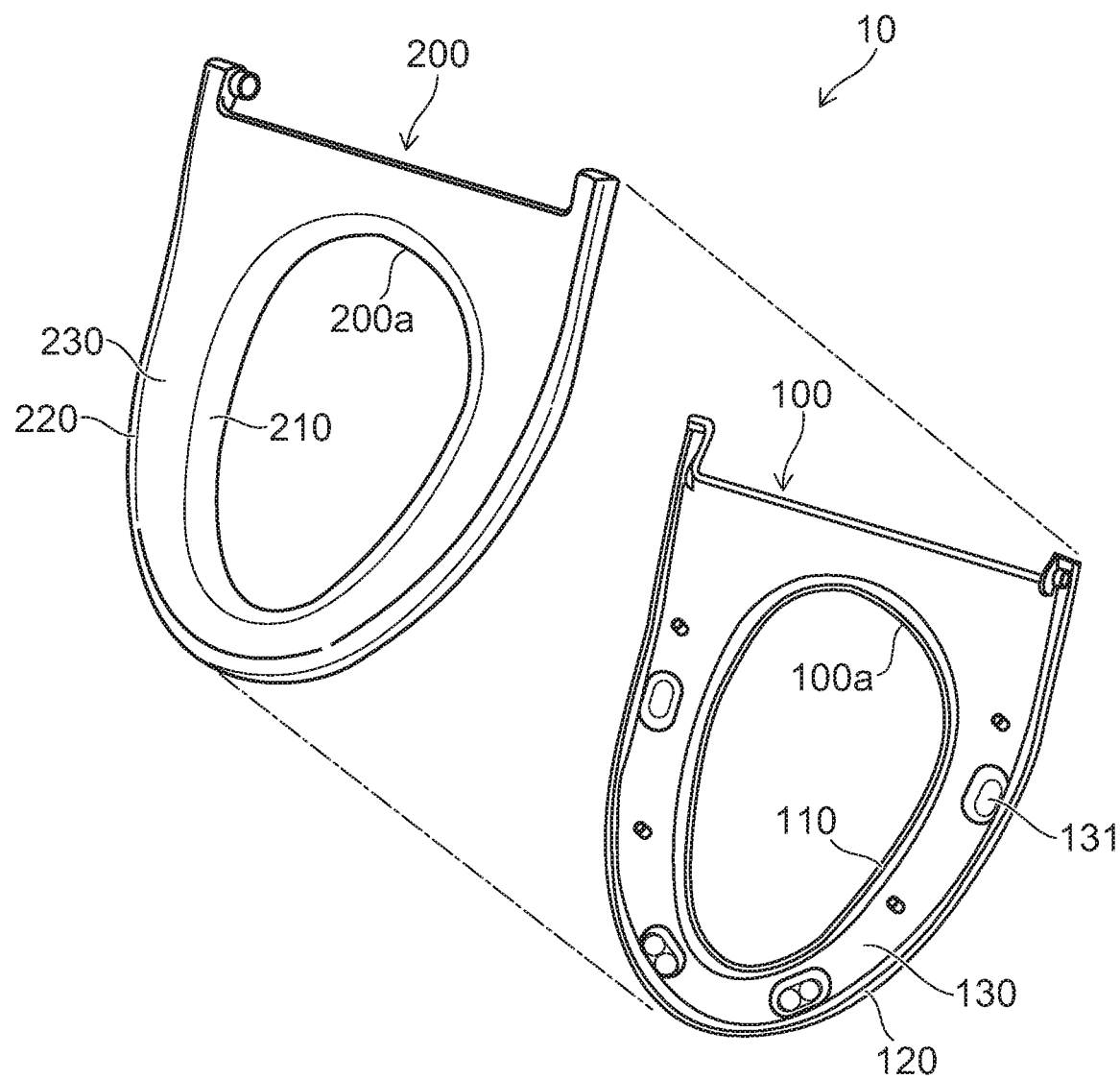
FIG. 2 is an exploded perspective view illustrating the toilet seat according to the embodiment.

FIG. 2 is an exploded perspective view illustrating the toilet seat according to the embodiment.

Figure 3:
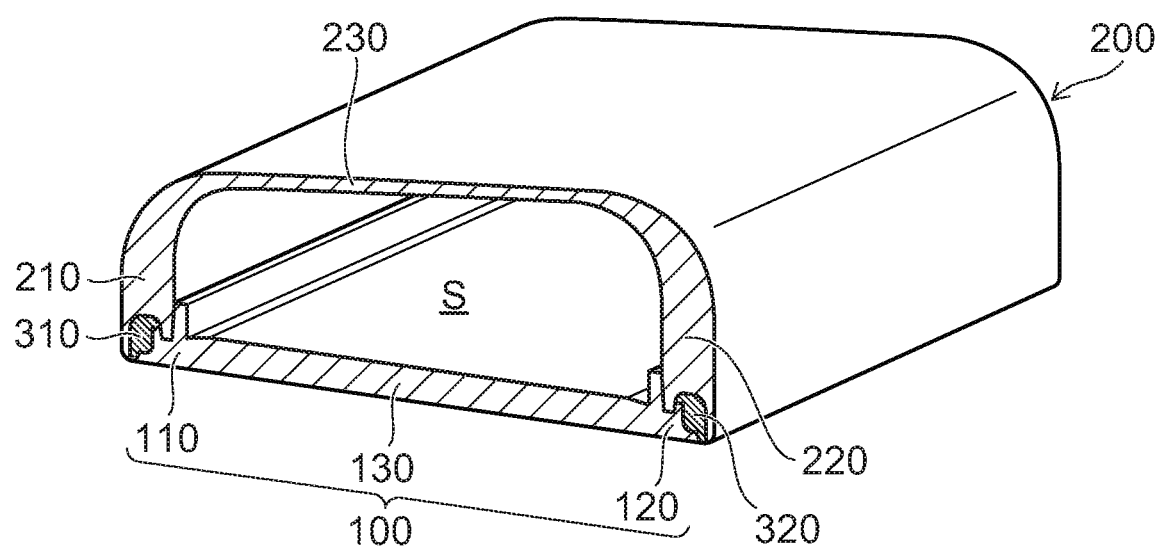
FIG. 3 is a perspective cross-sectional view illustrating a part of the toilet seat according to the embodiment.

FIG. 3 is a perspective cross-sectional view illustrating a part of the toilet seat according to the embodiment.

As illustrated in FIG. 2 and FIG. 3, the toilet seat 10 includes a bottom plate 100, a top plate 200, and bonding members 310 and 320. The top plate 200 is provided on the bottom plate 100. The bottom plate 100 and the top plate 200 are bonded by the bonding member 310 and the bonding member 320.

A more specific structure of the toilet seat 10 will now be described. Here, the directions of "upward", "downward", etc., are referenced to the state in which the bottom plate 100 of the toilet seat 10 is placed on a horizontal surface (the state of being placed on the toilet 6 so that the user can be seated).

As illustrated in FIG. 2, the bottom plate 100 and the top plate 200 respectively have an opening 100a and an opening 200a. The shapes of the bottom plate 100 and the top plate 200 when viewed from above are substantially the same as the shape of the toilet seat 10 when viewed from above. In other words, the shapes of the bottom plate 100 and the top plate 200 when viewed from above are ring-shaped or U-shaped. The opening 10a of the toilet seat 10 is formed of the opening 100a of the bottom plate 100 and the opening 200a of the top plate 200.

The bottom plate 100 includes an inner perimeter supporter 110, an outer perimeter supporter 120, and a bottom plate base 130. The thickness of the bottom plate base 130 is substantially uniform; for example, the front part is provided along the horizontal direction, and the back part is tilted upward. A support leg 131 that contacts the upper surface of the toilet 6 is provided as appropriate in the bottom plate base 130. The inner perimeter supporter 110 is provided at the inner perimeter side of the toilet seat 10 with respect to the bottom plate base 130. The outer perimeter supporter 120 is provided at the outer perimeter side of the toilet seat 10 with respect to the bottom plate base 130.

The top plate 200 includes an inner perimeter sidewall part 210, an outer perimeter sidewall part 220, and a seating part 230. The seating part 230 supports, from below, the buttocks of the user seated on the toilet seat 10. The seating part 230 is supported from below by the inner perimeter sidewall part 210 and the outer perimeter sidewall part 220. The inner perimeter sidewall part 210 is provided at the inner perimeter side of the toilet seat 10 with respect to the seating part 230. The outer perimeter sidewall part 220 is provided at the outer perimeter side of the toilet seat 10 with respect to the seating part 230.

As illustrated in FIG. 3, the inner perimeter sidewall part 210 is provided on the inner perimeter supporter 110 of the bottom plate 100. The outer perimeter sidewall part 220 is provided on the outer perimeter supporter 120 of the bottom plate 100. The lower end of the inner perimeter sidewall part 210 is bonded to the inner perimeter supporter 110 by the bonding member 310, and the lower end of the outer perimeter sidewall part 220 is bonded to the outer perimeter supporter 120 by the bonding member 320.

The bottom plate base 130 and the seating part 230 are separated in the vertical direction. Also, the inner perimeter sidewall part 210 and the outer perimeter sidewall part 220 are separated in the horizontal direction. Thereby, an internal space S is formed in the toilet seat 10 and surrounded with the bottom plate 100 and the top plate 200.

In the case where the toilet seat 10 is U-shaped, etc., the inner perimeter supporter 110 and the outer perimeter supporter 120 may be linked around the bottom plate base 130, and the inner perimeter sidewall part 210 and the outer perimeter sidewall part 220 may be linked around the seating part 230. In such a case, the bonding member 310 and the bonding member 320 may be continuous around the bottom plate base 130 and may be provided to have a continuous body.

Figure 4:
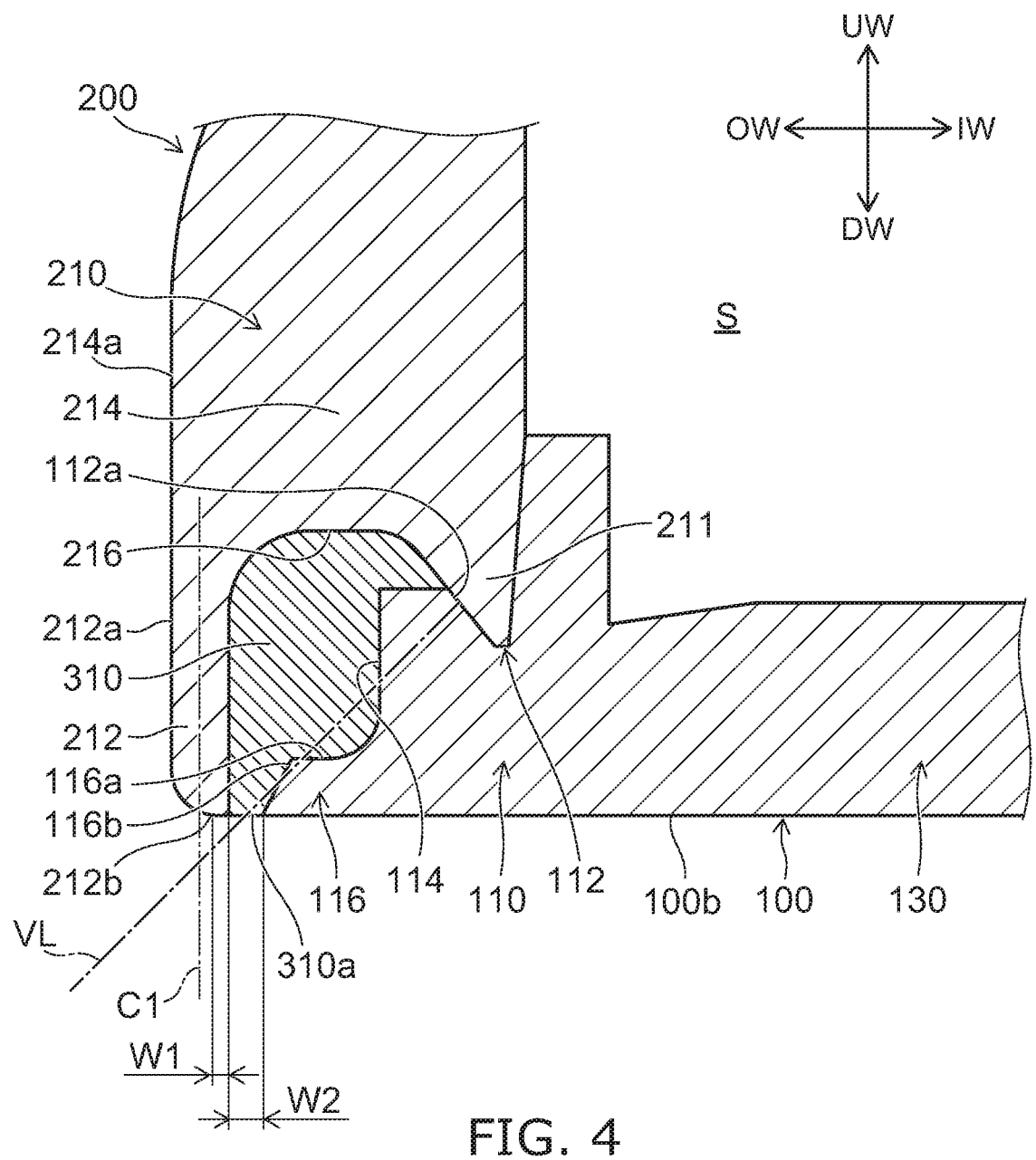
FIG. 4 is a cross-sectional view in which a part of the cross section of FIG. 3 is enlarged.
Figure 5:
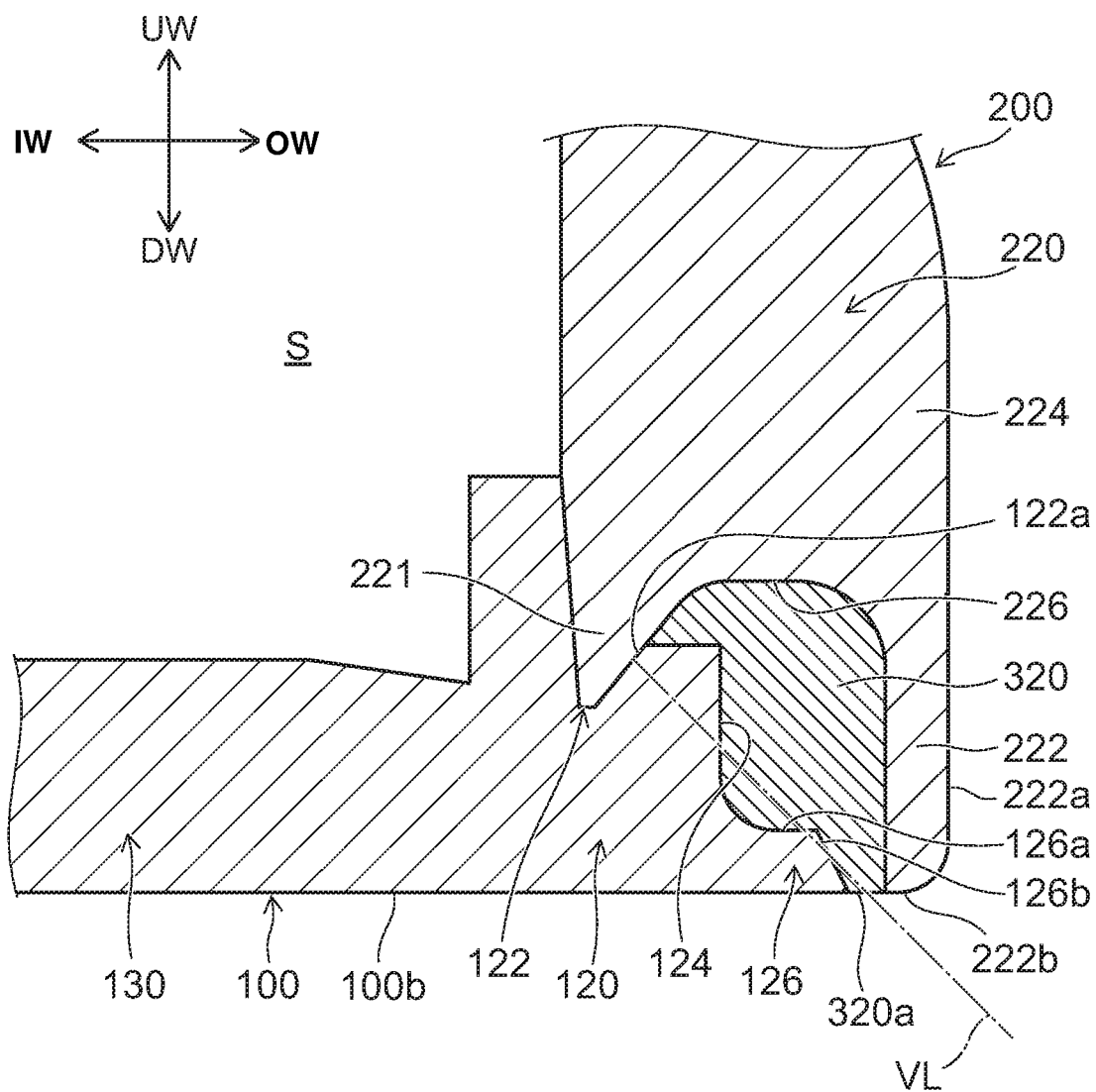
FIG. 5 is a cross-sectional view in which a part of the cross section of FIG. 3 is enlarged.

FIG. 4 and FIG. 5 are cross-sectional views in which parts of the cross section of FIG. 3 are enlarged.

FIG. 4 illustrates a part of the inner perimeter supporter 110 and a part of the inner perimeter sidewall part 210. FIG. 5 illustrates a part of the outer perimeter supporter 120 and a part of the outer perimeter sidewall part 220.

Here, in this specification, the direction from the internal space S toward the top plate 200 along the horizontal direction is taken as "outward", and the direction from the top plate 200 toward the internal space S along the horizontal direction is taken as "inward". FIG. 4 illustrates inward IW and outward OW as referenced to the inner perimeter sidewall part 210, and FIG. 5 illustrates inward IW and outward OW as referenced to the outer perimeter sidewall part 220.

As illustrated in FIG. 4, the inner perimeter supporter 110 of the bottom plate 100 includes an engaging part 112 having a recessed shape. The engaging part 112 is provided at a position opposing the inner perimeter sidewall part 210 and has a recessed shape recessed downward.

The inner perimeter sidewall part 210 includes a first hanging part 211, a second hanging part 212, and a sidewall base 214. The sidewall base 214 supports the seating part 230. The first hanging part 211 extends downward from the lower end of the sidewall base 214, overlaps the inner perimeter supporter 110 of the bottom plate 100, and engages the engaging part 112.

The second hanging part 212 is provided to be separated from the first hanging part 211 at the lower end of the sidewall base 214 to provide a recess or recess portion 216 recessed upward between the first hanging part 211 and the second hanging part 212, and is disposed at a position not overlapping the bottom plate 100 in the vertical direction.

The bonding member 310 is provided in the recess 216. The bonding member 310 has an exposed surface 310*a* exposed externally. The exposed surface 310*a* of the bonding member 310 is disposed between the second hanging part 212 and the bottom plate 100. The exposed surface 310*a* is substantially coplanar with the lower end of the second hanging part 212. Also, the exposed surface 310*a* is substantially coplanar with a bottom surface 100*b* of the bottom plate 100. Thereby, the occurrence of a gap, a step, etc., at the bonding part between the bottom plate 100 and the top plate 200 can be suppressed, and the cleanability of the toilet seat 10 can be improved. Here, for example, "substantially coplanar" refers to the height difference occurring between two adjacent members being 0.3 mm or less.

The first hanging part 211 is provided inward, and the second hanging part 212 is provided further outward than the first hanging part 211. The second hanging part 212 has a side surface 212*a* facing away from the recess 216. In other words, the side surface 212*a* is a side surface facing outward. The side surface 212*a* of the second hanging part 212 is continuous with a side surface 214*a* of the sidewall base 214 facing outward. In other words, a step or the like is not provided between the sidewall base 214 and the second hanging part 212. Thereby, degradation of the cleanability due to the step or the like can be suppressed, and the user having discomfort due to the step or the like touching the bottom, a leg, etc., of the user can be suppressed.

The width of the second hanging part 212 in the thickness direction of the inner perimeter sidewall part 210 in which the first hanging part 211, the recess 216, and the second hanging part 212 are arranged decreases downward from the sidewall base 214. In other words, the second hanging part 212 becomes thinner downward. Here, "decreasing downward" is not limited to decreasing continuously downward and includes decreasing in stages, etc. In other words, parts that have widths that substantially do not change may be included. Hereinbelow, the expression "-ing downward" similarly may include a part that substantially does not change.

The side surface 212*a* of the second hanging part 212 approaches the recess 216 side downward from the sidewall base 214. Thereby, as recited above, the width in the thickness direction of the second hanging part 212 decreases downward from the sidewall base 214.

For example, the lower end portion of the side surface 212*a* of the second hanging part 212 approaches the recess 216 side by curving in the form of a convex surface. In other words, so-called rounding of the lower end portion of the second hanging part 212 is performed. For example, the lower end portion of the side surface 212*a* of the second hanging part 212 may approach the recess 216 side by being tilted linearly. In other words, so-called chamfering of the lower end portion of the second hanging part 212 may be performed. However, by curving the lower end portion of the side surface 212*a* in the form of a convex surface, compared to the case of being tilted linearly, the occurrence of corners, etc., can be suppressed. For example, the user having discomfort due to the bottom, a leg, etc., of the user touching a corner or the like of the side surface 212*a* can be suppressed.

A lower end 212*b* of the side surface 212*a* of the second hanging part 212 is positioned at the recess 216 side of a center C1 in the thickness direction of the second hanging part 212. More specifically, for example, the center C1 in the thickness direction of the second hanging part 212 is the center in the thickness direction of a part of the second hanging part 212 that is not curved or tilted. Or, the center C1 is the center of the average of the width in the thickness direction of the second hanging part 212.

Also, a width W1 in the thickness direction of the lower end of the second hanging part 212 is less than a width W2 in the thickness direction of the exposed surface 310a. The width W2 in the thickness direction of the exposed surface 310a is, for example, about 1 mm (e.g., not less than 0.5 mm and not more than 3 mm). For example, in the case where the lower end of the second hanging part 212 is continuous with the exposed surface 310a at the curved or tilted part, the width W1 in the thickness direction of the lower end of the second hanging part 212 limitlessly approaches zero. For example, the width in the thickness direction of the part of the second hanging part 212 that is not curved or tilted is not less than 1 mm and not more than 2 mm. Thereby, the pressure when filling the resin used to form the bonding member 310 can be received appropriately by the second hanging part 212 while appropriately suppressing an excessively thick second hanging part 212.

A side surface 112a of the engaging part 112 facing away from the second hanging part 212 extends away from the second hanging part 212 downward. For example, the side surface 112a extends away from the second hanging part 212 downward by tilting linearly. For example, the side surface 112a may extend away from the second hanging part 212 downward by curving in the form of a convex surface or in the form of a concave surface.

The configuration of the first hanging part 211 corresponds to the configuration of the engaging part 112. The configuration of the first hanging part 211 is substantially the same as the configuration of the engaging part 112. Thereby, the first hanging part 211 engages the engaging part 112. By engaging the engaging part 112, for example, the first hanging part 211 suppresses the undesirable flow of the resin into the internal space S when filling the resin used to form the bonding member 310.

A virtual line VL that is orthogonal to at least a part of the side surface 112a of the engaging part 112 passes through the exposed surface 310a.

The inner perimeter supporter 110 of the bottom plate 100 includes an opposing surface 114 opposing the second hanging part 212, and a protruding part 116 extending from the lower end portion of the opposing surface 114 toward the second hanging part 212. The protruding part 116 has an upper surface 116a facing upward. At least a part of the upper surface 116a of the protruding part 116 is substantially parallel to the bottom surface 100b of the bottom plate 100. Here, for example, "substantially parallel" is the state in which the angle difference between the upper surface 116a and the bottom surface 100b is ±2° or less.

The protruding part 116 has a side surface 116b opposing the second hanging part 212. The side surface 116b of the protruding part 116 approaches the second hanging part 212 downward. For example, the side surface 116b approaches the second hanging part 212 downward by tilting linearly. For example, the side surface 116b may approach the second hanging part 212 downward by curving in the form of a convex surface or in the form of a concave surface.

Also, the angle between the upper surface 116a of the protruding part 116 and the bottom surface 100b of the bottom plate 100 is less than the angle between the side surface 116b of the protruding part 116 and the bottom surface 100b of the bottom plate 100. The upper surface 116a is not limited to a surface substantially parallel to the bottom surface 100b and may be, for example, a surface having a more gradual tilt than the side surface 116b, etc. The configuration of the protruding part 116 is not limited to the configurations recited above. For example, the protruding part 116 may have a substantially rectangular shape having a substantially horizontal upper surface 116a and a substantially vertical side surface 116b, etc. Or, for example, the protruding part 116 may have a configuration in which only the side surface 116b is tilted downward continuously from the opposing surface 114, etc.

As illustrated in FIG. 5, the outer perimeter supporter 120 of the bottom plate 100 includes an engaging part 122. The outer perimeter sidewall part 220 includes a first hanging part 221, a second hanging part 222, a sidewall base 224, and a recess 226. The bonding member 320 is provided in the recess 226 and has an exposed surface 320a. Other than being symmetric with the vertical direction as an axis, the configurations of the outer perimeter supporter 120 and the outer perimeter sidewall part 220 are substantially the same as the configurations of the inner perimeter supporter 110 and the inner perimeter sidewall part 210. Accordingly, a detailed description of the outer perimeter supporter 120 and the outer perimeter sidewall part 220 is omitted.

The bottom plate 100, the top plate 200, the bonding member 310, and the bonding member 320 include, for example, polypropylene, ABS (Acrylonitrile-Butadiene-Styrene), PBT (Polybutylene Terephthalate), a polycarbonate composite material, etc.

Figure 6:
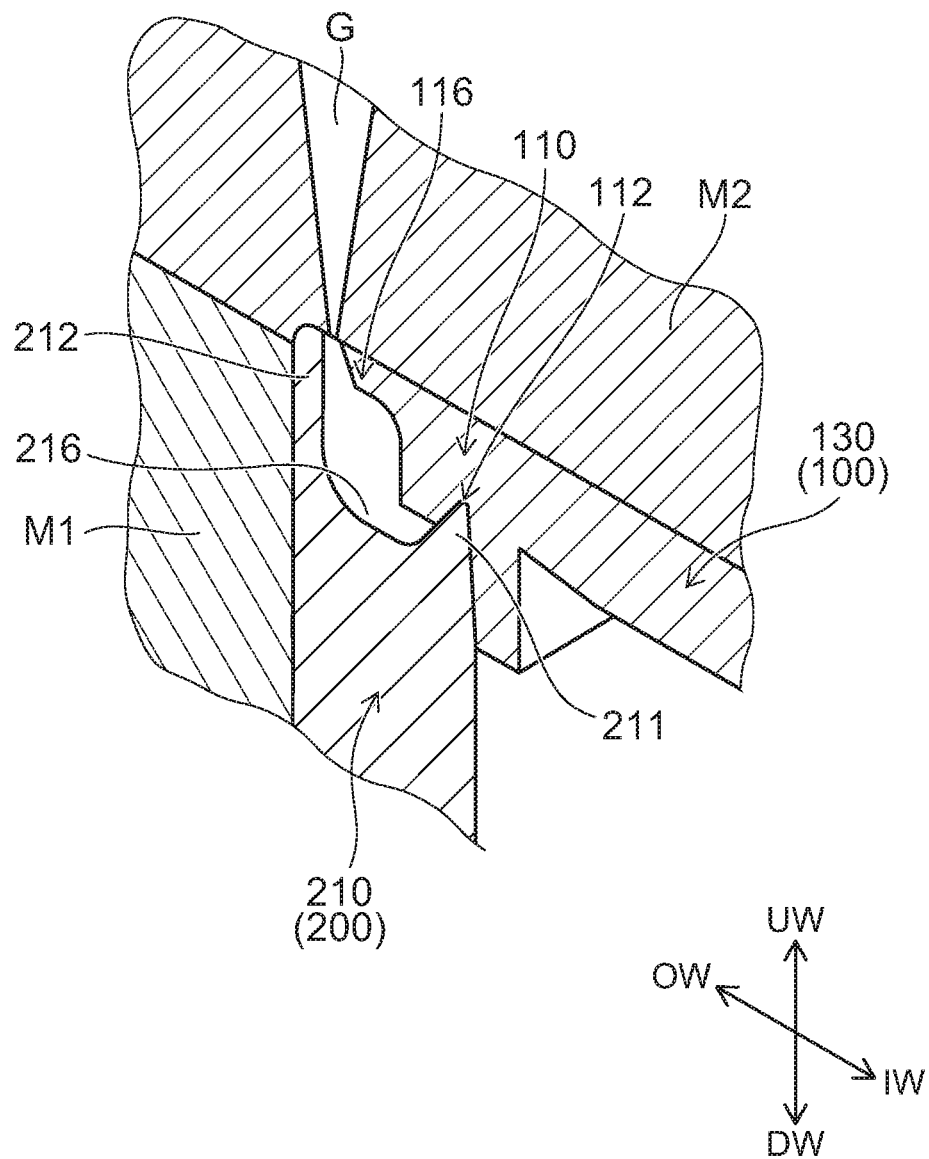
FIG. 6 is a cross-sectional view illustrating a manufacturing process of the toilet seat according to the embodiment.

FIG. 6 is a cross-sectional view illustrating a manufacturing process of the toilet seat according to the embodiment. FIG. 6 illustrates a part of the inner perimeter supporter 110 and a part of the inner perimeter sidewall part 210.

As described above, for example, the structures of the outer perimeter supporter 120 and the outer perimeter sidewall part 220 at the bonding member 320 vicinity and the structures of the inner perimeter supporter 110 and the inner perimeter sidewall part 210 at the bonding member 310 vicinity are respectively substantially similar. Therefore, here, the manufacturing process of the toilet seat 10 is described using the part of the inner perimeter supporter 110 and the part of the inner perimeter sidewall part 210 as an example.

First, the top plate 200 is placed on a mold M1 with the seating part 230 downward. At this time, the top plate 200 is fit into the mold M1, and the outer side surface of the top plate 200 is pressed by the mold M1. Subsequently, the bottom plate 100 is placed on the top plate 200. At this time, as illustrated in FIG. 6, the first hanging part 211 of the inner perimeter sidewall part 210 engages the engaging part 112 of the inner perimeter supporter 110, and the inner perimeter supporter 110 is placed on the inner perimeter sidewall part 210 so that a gap that is used as an injection inlet is formed between the protruding part 116 and the second hanging part 212.

In this state, the bottom plate 100 is pressed downward by a mold M2. A gate G for injecting a resin used to form the bonding member 310 is provided in the mold M2. The mold M2 is placed on the bottom plate 100 and the top plate 200 so that the gate G is positioned at the gap between the protruding part 116 and the second hanging part 212.

In this state, a heated resin is injected from the gate G into the recess 216 through the gap between the protruding part 116 and the second hanging part 212. When the heated resin is injected into the gap, the surfaces of the bottom plate 100 and the top plate 200 in contact with the resin are melted by the heat and mix with the resin. Subsequently, the bottom plate 100 and the top plate 200 are bonded by cooling and curing the resin to become the bonding member 310. After bonding the bottom plate 100 and the top plate 200, beveling of the tip of the second hanging part 212, deburring of the resin, etc., may be performed as appropriate. Thus, the toilet seat 10 according to the embodiment is made.

In the toilet seat 10 according to the embodiment as described above, because the widths of the second hanging parts 212 and 222 decrease downward from the sidewall bases 214 and 224, when manufacturing the toilet seat 10 by pressing the mold M2 to the bottom plate 100 and the second hanging parts 212 and 222 and injecting the resin used to form the bonding members 310 and 320 into the recesses 216 and 226 from the bottom plate 100 side, the contact area between the mold M2 and the second hanging parts 212 and 222 can be small, and the contact pressure between the mold M2 and the lower end portions of the second hanging parts 212 and 222 that are parts of the injection inlets can be increased. Thereby, the undesirable leakage of the injected resin from the injection inlet can be suppressed appropriately even without providing a projection, etc. It is unnecessary to add a process for removing leaked resin, a projection, etc., and the decrease of the productivity can be suppressed. Accordingly, in the case where the top plate 200 and the bottom plate 100 are bonded by filling a resin, the toilet seat 10 can be provided in which high cleanability and productivity can be obtained while appropriately suppressing the resin leakage.

For example, there is a possibility of a greater amount of melting between the resin and the bottom plate 100 and between the resin and the top plate 200 at the vicinity of the gate G, etc., when the heated resin is injected. In such a case, there is a possibility that it may be difficult to confirm whether or not the widths of the second hanging parts 212 and 222 decrease downward from the sidewall bases 214 and 224 at the vicinity of the gate G, etc. Therefore, the widths of the second hanging parts 212 and 222 may not always have a relationship of decreasing downward from the sidewall bases 214 and 224 for the entire circumference of the toilet seat 10. The widths of the second hanging parts 212 and 222 may include parts without the relationship of decreasing downward from the sidewall bases 214 and 224 for at least a part of the toilet seat 10 in the circumferential direction.

Also, in the toilet seat 10, the side surfaces 212a and 222a of the second hanging parts 212 and 222 facing away from the recesses 216 and 226 approach the recess 216 side and the recess 226 side downward from the sidewall bases 214 and 224. Thereby, the lower end portions of the second hanging parts 212 and 222 can be deflected toward the bottom plate 100 side when the pressure accompanying the pressing of the mold M2 is applied to the second hanging parts 212 and 222. In other words, the lower end portions of the second hanging parts 212 and 222 can be deflected to make the injection inlets narrow. Furthermore, due to the injection pressure of the resin, a large contact pressure is generated by the lower end portions of the second hanging parts 212 and 222 strongly pressing on the mold M2 due to the force of the lower end portions biased to return outward. Thereby, the resin leakage can be suppressed more reliably.

Also, in the toilet seat 10, the lower ends 212b and 222b of the side surfaces 212a and 222a of the second hanging parts 212 and 222 facing away from the recesses 216 and 226 are positioned at the recess 216 side and the recess 226 side of the centers C1 in the thickness direction of the second hanging parts 212 and 222. Thereby, the contact area between the mold M2 and the second hanging parts 212 and 222 can be reduced further, and the contact pressure between the mold M2 and the lower end portions of the second hanging parts 212 and 222 that are parts of the injection inlets can be increased further. Also, the lower end portions of the second hanging parts 212 and 222 can be deflected more reliably toward the bottom plate 100 side when the pressure accompanying the pressing of the mold M2 is applied to the second hanging parts 212 and 222. Furthermore, due to the injection pressure of the resin, a large contact pressure is generated by the lower end portions of the second hanging parts 212 and 222 strongly pressing on the mold M2 due to the force of the lower end portions biased to return outward. Thereby, the resin leakage can be suppressed more reliably.

Also, in the toilet seat 10, the widths W1 in the thickness direction of the lower ends of the second hanging parts 212 and 222 are less than the widths W2 in the thickness direction of the exposed surfaces 310a and 320a. Thereby, the contact area between the mold M2 and the second hanging parts 212 and 222 can be reduced further, and the contact pressure between the mold M2 and the lower end portions of the second hanging parts 212 and 222 that are parts of the injection inlets can be increased further. Thereby, the resin leakage can be suppressed more reliably.

Also, in the toilet seat 10, because the side surfaces 112a and 122a of the engaging parts 112 and 122 facing away from the second hanging parts 212 and 222 are tilted or curved away from the second hanging parts 212 and 222 downward, the force that accompanies the pressing of the mold M2 can be transferred from the side surfaces 112a and 122a of the engaging parts 112 and 122 to the lower end portions of the parts of the bottom plate 100 opposing the second hanging parts 212 and 222 when manufacturing the toilet seat 10 by pressing the mold M2 to the bottom plate 100 and the second hanging parts 212 and 222 and injecting the resin used to form the bonding members 310 and 320 into the recesses 216 and 226 from the bottom plate 100 side. In the example, the force can be transferred to the lower end portions of the protruding parts 116 and 126 opposing the second hanging parts 212 and 222. The lower end portions of the parts of the bottom plate 100 opposing the second hanging parts 212 and 222 become parts of the injection inlets for injecting the resin. Thus, by transferring the force accompanying the pressing of the mold M2 to the parts of the bottom plate 100 used as parts of the injection inlets, the contact pressure between the mold M2 and the peripheries of the injection inlets can be increased without providing a projection, etc. Thereby, the undesirable leakage of the injected resin from the injection inlets can be suppressed appropriately even without providing a projection, etc. It is unnecessary to add a process for removing leaked resin, a projection, etc., and the decrease of the productivity can be suppressed. Accordingly, in the case where the top plate and the bottom plate are bonded by filling a resin, a toilet seat can be provided in which high cleanability and productivity can be obtained while appropriately suppressing the resin leakage.

The entire circumference of the toilet seat 10 may not always have the relationship recited above. The side surfaces 112a and 122a may include parts without the relationship of extending away from the second hanging parts 212 and 222 downward in at least a part of the toilet seat 10 in the circumferential direction.

Also, in the toilet seat 10, the virtual lines VL that are orthogonal to at least parts of the side surfaces 112a and 122a of the engaging parts 112 and 122 pass through the exposed surfaces 310a and 320a. Thereby, the force that accompanies the pressing of the mold M2 can be transferred more appropriately to the lower end portions of the parts of the bottom plate 100 opposing the second hanging parts 212 and 222 and used as parts of the injection inlets for injecting the resin (the lower end portions of the protruding parts 116 and 126). Accordingly, the contact pressure between the mold M2 and the peripheries of the injection inlets can be increased further, and the resin leakage can be suppressed more reliably.

Also, in the toilet seat 10, the bottom plate 100 includes the opposing surfaces 114 and 124 opposing the second hanging parts 212 and 222, and the protruding parts 116 and 126 extending from the lower end portions of the opposing surfaces 114 and 124 toward the second hanging parts 212 and 222. Thereby, the pressure that accompanies the injection of the resin can be transferred via the protruding parts 116 and 126 to the lower end portions of the parts of the bottom plate 100 opposing the second hanging parts 212 and 222. Thereby, the contact pressure between the mold M2 and the peripheries of the injection inlets can be increased further, and the resin leakage can be suppressed more reliably.

Also, in the toilet seat 10, the protruding parts 116 and 126 include the side surfaces 116b and 126b opposing the second hanging parts 212 and 222, and the side surfaces 116b and 126b of the protruding parts 116 and 126 approach the second hanging parts 212 and 222 downward. Thereby, the pressure that accompanies the injection of the resin can be transferred more appropriately via the protruding parts 116 and 126 to the lower end portions of the parts of the bottom plate 100 opposing the second hanging parts 212 and 222, and the resin leakage can be suppressed more reliably.

Also, in the toilet seat 10, the angles between the bottom surface 100b of the bottom plate 100 and the upper surfaces 116a and 126a of the protruding parts 116 and 126 are less than the angles between the bottom surface 100b of the bottom plate 100 and the side surfaces 116b and 126b of the protruding parts 116 and 126. Thereby, the pressure that accompanies the injection of the resin can be transferred more appropriately via the protruding parts 116 and 126 to the lower end portions of the parts of the bottom plate 100 opposing the second hanging parts 212 and 222, and the resin leakage can be suppressed more reliably.

FIG. 7A and FIG. 7B are cross-sectional views illustrating modifications of the inner perimeter supporter and the inner perimeter sidewall part according to the embodiment.

Components that have substantially the same functions and configurations as those of the embodiments recited above are marked with the same reference numerals, and a detailed description is omitted. Also, in the modifications described below as well, other than being symmetric with the vertical direction as an axis, the configurations of the outer perimeter supporter 120 and the outer perimeter sidewall part 220 are substantially the same as the configurations of the inner perimeter supporter 110 and the inner perimeter sidewall part 210, and a detailed description is therefore omitted.

In the embodiments recited above, the widths of the second hanging parts 212 and 222 are caused to decrease downward from the sidewall bases 214 and 224 by the side surface 212a of the second hanging part 212 approaching the recess 216 side downward from the sidewall base 214.

This is not limited thereto; for example, as illustrated in FIG. 7A, the widths of the second hanging parts 212 and 222 may be caused to decrease downward from the sidewall bases 214 and 224 by the side surface 212a of the second hanging part 212 approaching the recess 216 side downward from the sidewall base 214 and by a bonding part 212c between the bonding member 310 of the second hanging part 212 extending away from the bottom plate 100 downward from the sidewall base 214.

In such a case, the bonding part 212c may extend away from the bottom plate 100 downward by being tilted as illustrated in FIG. 7A, or may extend away from the bottom plate 100 downward by being curved in the form of a convex surface or in the form of a concave surface. Also, even in the case where the side surface 212a and the bonding part 212c are tilted or curved, it is favorable for the lower end 212b of the side surface 212a of the second hanging part 212 to be positioned at the recess 216 side of the center C1 in the thickness direction of the second hanging part 212 as illustrated in FIG. 7A.

In the example as illustrated in FIG. 7B, the bonding part 212c between the second hanging part 212 and the bonding member 310 approaches the bottom plate 100 side downward from the sidewall base 214. For example, the bonding part 212c may be tilted or curved in a recessed shape as illustrated in FIG. 7B. In such a case, at positions at the same height, the tilt angle or the curvature of the bonding part 212c is less than the tilt angle or the curvature of the side surface 212a.

Thus, because the bonding part 212c between the second hanging part 212 and the bonding member 310 approaches the bottom plate 100 side downward from the sidewall base 214, for example, the lower end portion of the second hanging part 212 can be deflected more toward the bottom plate 100 side when the pressure accompanying the pressing of the mold M2 is applied to the second hanging part 212. Furthermore, due to the injection pressure of the resin, a large contact pressure is generated by the lower end portion of the second hanging part 212 strongly pressing on the mold M2 due to the force of the lower end portion biased to return outward. Thereby, the resin leakage can be suppressed more reliably.

As described above, there is a possibility that the interface between the bonding part 212c and the bonding member 310 may be difficult to discriminate due to mutual melting. In such a case, for example, it is sufficient to use the part at which the components of the material of the second hanging part 212 become higher than the components of the material of the bonding member 310 as the interface (the bonding part 212c) of the second hanging part 212.

Hereinabove, embodiments of the invention are described. However, the invention is not limited to these descriptions. Appropriate design modifications made by one skilled in the art for the embodiments described above also are within the scope of the invention to the extent that the features of the invention are included. For example, the configurations, the dimensions, the materials, the arrangements, the mounting forms, etc., of the components included in the toilet seat 10, etc., are not limited to those illustrated and can be modified appropriately.

Also, the components included in the embodiments described above can be combined within the limits of technical feasibility, and such combinations also are within the scope of the invention to the extent that the features of the invention are included.

REFERENCE NUMERAL LIST 2 toilet device
4 toilet seat device
6 toilet 10 toilet seat
12 toilet lid
14 main part
100 bottom plate
110 inner perimeter supporter
112 engaging part
114 opposing surface
116 protruding part
120 outer perimeter supporter
122 engaging part
130 bottom plate base
131 support leg
200 top plate
210 inner perimeter sidewall part
211 first hanging part
212 second hanging part
214 sidewall base
216 recess
220 outer perimeter sidewall part
221 first hanging part
222 second hanging part
224 sidewall base
226 recess
230 seating part
310 bonding member
320 bonding member

The invention claimed is:

1. A toilet seat, comprising:

a bottom plate including an engaging part, the engaging part having a recessed shape;

a top plate including a sidewall part and a seating part, the sidewall part being provided on the bottom plate, the seating part being supported by the sidewall part; and a bonding member bonding the bottom plate and the sidewall part and having an exposed surface exposed externally, the engaging part being provided at a position opposing the sidewall part, the recessed shape of the engaging part being recessed downward, the sidewall part including a sidewall base supporting the seating part, a first hanging part extending downward from a lower end of the sidewall base, overlapping the bottom plate, and engaging the engaging part, and a second hanging part provided to be separated from the first hanging part at the lower end of the sidewall base to provide a recess portion recessed upward between the first hanging part and the second hanging part, the second hanging part being disposed at a position not overlapping the bottom plate in a vertical direction, the bonding member being provided in the recess portion, the exposed surface being disposed between the second hanging part and the bottom plate, a side surface of the engaging part facing away from the second hanging part and extending away from the second hanging part downward, a width in a thickness direction of the exposed surface being less than a width in the thickness direction of the side surface of the engaging part, the thickness direction being a direction in which the first hanging part, the recess portion, and the second hanging part are arranged, a virtual line orthogonal to at least a part of the side surface of the engaging part passing through the exposed surface.

2. The toilet seat according to claim 1, wherein the bottom plate includes an opposing surface and a protruding part, the opposing surface opposing the second hanging part, the protruding part extending from a lower end portion of the opposing surface toward the second hanging part.

3. The toilet seat according to claim 2, wherein the protruding part has a side surface opposing the second hanging part, and the side surface of the protruding part approaches the second hanging part downward.

4. The toilet seat according to claim 3, wherein the protruding part has an upper surface facing upward, and the upper surface of the protruding part is provided between the side surface of the protruding part and the opposing surface.

* * * * *